United States Patent [19]

Takagi

[11] Patent Number: 4,805,056
[45] Date of Patent: Feb. 14, 1989

[54] MAGNETIC DISC DRIVE

[75] Inventor: Seizo Takagi, Hyogo, Japan

[73] Assignee: Mitsubishi Denki Kabushiki Kaisha, Japan

[21] Appl. No.: 105,868

[22] Filed: Oct. 7, 1987

Related U.S. Application Data

[63] Continuation of Ser. No. 892,342, Aug. 1, 1986, abandoned.

[51] Int. Cl.$^4$ .............................................. G11B 5/54
[52] U.S. Cl. ................................................... 360/106
[58] Field of Search ................................... 360/106, 97

[56] References Cited

U.S. PATENT DOCUMENTS 4,599,666  7/1986  Liu ....................................... 360/106
4,652,953  3/1987  Sakurai ................................ 360/106

Primary Examiner—A. J. Heinz
Attorney, Agent, or Firm—Wolf, Greenfield & Sacks

[57] ABSTRACT

A magnetic disc drive for moving a magnetic head to a predetermined position on a magnetic disc which is rotated about a center S thereof comprises an arm for securing the magnetic head thereto and capable of swinging about a center P thereof; a capstan capable of rotating about a center C thereof so as to generate a driving power for the arm; and a flexible member wound on the capstan, both ends of which are respectively coupled to positions spaced apart by a predetermined interval on the arm, for transmitting the driving power to the arm so that it is forced to swing about the center P, wherein the centers S, P and C of the magnetic disc, the arm and the capstan, respectively, are so disposed as to have a relationship of $90° \leq \angle CPS < 180°$ and, where a position of the magnetic head is defined by H, the magnetic head is positioned to have a relationship of $\overline{CP} < \overline{HP}$, whereby the magnetic head can be forced to swing about the center P of the arm within an area defined by the angle, $\angle CPS$.

6 Claims, 1 Drawing Sheet

MAGNETIC DISC DRIVE

This application is a continuation of application Ser. No. 06/892,342, filed Aug. 1, 1986, now abandoned.

BACKGROUND OF THE INVENTION

1. Field of the Invention

The present invention relates to a magnetic disc drive and, in particular, to a positioning mechanism for read/write heads in a recording/playback system in which magnetic discs are utilized for information storage media.

2. Prior Art

FIG. 1 shows a conventional magnetic disc drive as disclosed in Japanese Patent Public Disclosure (Kokai) No. 59-58670 in the Official Gazette of 1984. In the drawing are shown a magnetic disc 1; a spindle motor 2 for rotating the magnetic disc 1; a magnetic head 3 for reading and writing information as electric signals to and from the magnetic disc 1; an arm 4 capable of swinging about a pivot 5, on which the head 3 is secured; a capstan 6; a stepping motor 7 directly coupled to the capstan 6 for driving the arm 4 through a steel belt 8; and a spring 9 for providing the steel belt 8 with a fixed tension.

An operation of the conventional drive will next be explained.

The magnetic disc 1 is rotated by the spindle motor 2 at the speed of, for example, 3,600 r.p.m.

The capstan 6 is rotated by the stepping motor 7 so that the driving power of the stepping motor 7 is decelerately transmitted to the arm 4 through the steel belt 8 to which a predetermined tension is provided by the spring 9. is positioned at a predetermined position on the magnetic disc 1. In such a manner, the magnetic head 3 can write information onto the magnetic disc or can read out the stored information therefrom.

However, since the conventional head positioning mechanism is constructed as described above, in a magnetic disc drive having a frame of restricted size it is not possible to allow the magnetic head 3 to have an effectively and relatively large radius of swing. Assuming that an attempt were made to obtain a desired capability by putting the angle (hereinafter referred to as a "YAW" angle) between a tangent of tracks for reading/writing information on the magnetic disc 1 and the main axis (or moving direction) of the magnetic head 3 within certain tolerance limits, for example, below 8 degrees, it might have been impossible to utilize an inner zone around the center of the magnetic disc. Thus, since only the outer zone of the magnetic disc is available for use, a disadvantage or problem has been experienced in that the memory capacity per disc must be correspondingly reduced.

SUMMARY OF THE INVENTION

The disadvantage or problem described above can be overcome by the present invention.

It is an object of the present invention, therefore, to provide an improved magnetic disc drive provided with a head positioning mechanism capable of effectively utilizing an inner zone of the magnetic disc, in addition to an outer zone thereof, within certain tolerance limits of the YAW angle. a magnetic disc drive for moving a magnetic head to a predetermined position on a magnetic disc which is rotated about a center S thereof comprising an arm for securing the magnetic head thereto and capable of swinging about a center P thereof; a capstan capable of rotating about a center C thereof so as to generate a driving power for the arm; and a flexible member wound on the capstan, both ends of which are respectively coupled to positions spaced apart by a predetermined interval on the arm, for transmitting the driving power to the arm so that it is forced to swing about the center P, wherein the centers S, P and C of the magnetic disc, the arm and the capstan, respectively, are so disposed as to have a relationship of $90° \leq \angle CPS < 180°$ and, where a position of the magnetic head is defined by H, the magnetic head is positioned to have a relationship of $\overline{CP} < \overline{HP}$, whereby the magnetic head can be forced to swing about the center P of the arm and within an area defined by the angle, $\angle CPS$.

According to the present invention, as described above, the centers S, P and C of the magnetic disc, the arm and the capstan, respectively, are disposed to have the relationship of $90° \leq \angle CPS < 180°$ and the position H of the magnetic head is determined by the relationship of $\overline{CP} < \overline{HP}$. Therefore, it is possible to increase relatively the distance between the center P of the arm and the position H of the magnetic head and, in other words, to reduce effectively the YAW angle even in the inner zone of the magnetic disc. This means that the memory capacity per disc can be increased by prior art.

These and other objects and advantages of the present invention will appear more clearly from the following detailed disclosure read in conjunction with the accompanying drawings.

PREFERRED EMBODIMENT OF THE INVENTION

Figure 1:
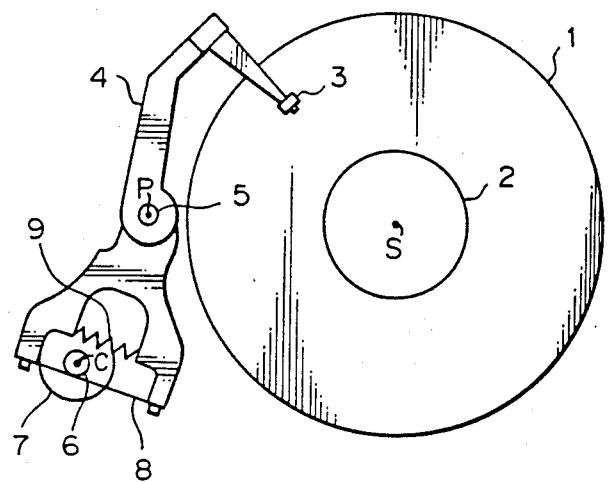
FIG. 1 is a constitutional diagram showing a conventional magnetic disc drive.
Figure 2:
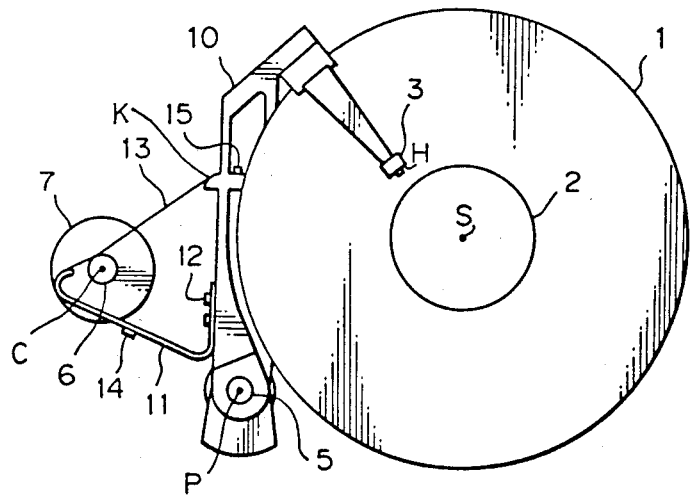
FIG. 2 is a constitutional diagram showing one preferred embodiment of the present invention.

In FIG. 2, the same reference numerals 1 to 3 and 5 to 7 are used to designate elements similar to those in FIG. 1. In the drawings, "C" denotes the center of a rotating axis of the capstan 6, "P" denotes the rotating center of the pivot 5, "S" denotes the center of a rotating axis of the spindle motor 2 and "H" denotes the position of the magnetic head 3. The capstan 6, the pivot 5 and the spindle motor 2 are so disposed as to have a relationship of $90° \leq \angle CPS < 180°$. An arm 10 is capable of swingly freely about the pivot 5 as its center and within an area defined by the angle, $\angle CPS$. The magnetic head 3 is provided on the arm 10 and they are so disposed as to have a relationship of $\overline{CP} < \overline{HP}$. A supporting member 11 is a flexible and L-shaped element, one end of the member being secured to the arm 10 by means of bolts 12. A flexible steel belt 13 is wound on the capstan 6 and is adapted to extend along the other end of the supporting the supporting member by bolts 14 and the other end being mounted on the arm 10 by bolts 15.

From FIG. 2 is it noted that the attachment of the belt 13 at the location of bolts 15 is at a distance from both pivot center P and axis center C. The distance from the belt 13 at the bolt 15 end thereof to pivot center P is greater than the distance between the pivot center P and axis center C. It is furthermore noted regarding FIG. 2 that the support member 11 is attached to the arm 10 (at bolts 12) at a position closer to the pivot center P than the position whereat the other end of the belt 13 (at bolts 15) is secured to the arm 10. Moreover, FIG. 2 illustrates the contact position of the belt 13 at position K which it is noted is also at a distance from pivot center P that is greater than the distance between centers P and C.

In operation, when the capstan 6 is driven or rotated by the stepping motor 7 in a counterclockwise ("ccw") direction while the magnetic disc 1 is rotated by the spindle motor 2, the right hand side of the steel belt 13 is wound onto the capstan 6, as shown, so that the arm 10 is forced to swing about the pivot 5 in a ccw direction. As a result, the magnetic head 3 is outwardly moved from the inner zone to the outer zone of the magnetic drive 1. In this case, the steel belt 13, of course, responds to the rotation of the capstan 6, because it is elastically tensed by the supporting member 11 to thereby provide a predetermined tension.

On the other hand, the movement of the magnetic head 3 from the outer zone to the inner zone of the disc can be effected by rotating the stepping motor 7 in a clockwise direction.

In place of the stepping motor 7 in the preferred embodiment, any motor of a continuously-rotating type, such as a D.C. torque motor, may be used in order to accomplish the same effect as the above.

In addition to the magnetic disc drive, it is apparent that the present invention may also be applied to an optical disc drive or an optical-magnetic disc drive.

What is claim is:

1. In a magnetic disc drive for moving a magnetic head to a predetermined position on a magnetic disc which is rotated about a center S thereof comprising an arm for securing said magnetic head thereto and capable of swinging about a center P thereof; a capstan capable of rotating about a center C thereof so as to generate a driving power for said arm; and a flexible member wound on said capstan, both ends of which are respectively coupled to positions spaced apart by a predetermined interval on said arm, for transmitting said driving power to the arm so that it is forced to swing about said center P, said centers S, P and C of the magnetic disc, the arm and the capstan, respectively, are so disposed as to have a relationship of $90° \leq CPS < 180°$ and, where a position of said magnetic head is defined by H, the magnetic head is positioned to have a relationship of $\overline{CP} < \overline{HP}$, whereby said arm for support of the magnetic head can be forced to swing about the center P of the arm and within an area defined by the angle, $\angle CPS$, which is an included angle formed between the lines $\overline{CP}$ and $\overline{SP}$, wherein said arm for supporting the magnetic head swings about the pivot center P of the arm only within the area defined by the angle, $\angle CPS$, wherein said flexible member comprises a belt means, having one and other ends in combination with, a tensed support member having one end secured to the arm and having another end at which one end of the belt means is supported, wherein the other end of the belt means is secured to said arm at a position intermediate the pivot center P and the magnetic head position H said tensed support member being secured to the arm at a position closer to the pivot center P than the position K whereat the other end of the belt means contacts said arm, the distance from the pivot center P to the position K whereat the other end of the belt means contacts said arm being greater than the distance from the pivot center P to the center C.

2. For a magnetic disc drive for moving a magnetic head to a predetermined position on a magnetic disc which is rotated about a center S thereof, head positioning apparatus comprising, an elongated arm, means for pivotally supporting one end of said arm at pivot center P and in a position adjacent said disc, means disposed at the other end of the elongated arm for supporting said magnetic head and including a member extending at an acute angle to the elongated arm axis, a capstan for providing drive power for said arm, means for rotatably supporting said capstan at center C in a position adjacent but spaced from said arm and disposed on the side of said arm remote from said disc, a flexible member wound on said capstan and having opposite ends, a tensed support member having one end for supporting one end of the flexible member and another end secured at a first position along said elongated arm close to pivot center P, means securing the other end of the flexible member to said elongated arm for contact of the flexible member at a second position K along said elongated arm spaced from said first position and more remote from said pivot center P than said first position is, said capstan being disposed at a position that is intermediate said one end of said tensed support member and said second position K, and drive means for said capstan to cause said flexible member to be wound on said capstanin a preselected direction to cause the elongated arm to pivot about pivot center P in turn causing the head to move across the disc.

3. For a magnetic disc drive as set forth in claim 2 wherein said support member has one leg at said one end thereof and another leg at said another end thereof.

4. For a magnetic disc drive as set forth in claim 3 wherein said support member legs are disposed at an acute angle to each other.

5. For a magnetic disc drive as set forth in claim 4 wherein said another leg has a curved end extending tangentially to said capstan.

6. For a magnetic disc drive as set forth in claim 5 wherein said curved end of said another leg is disposed on the side of said capstan remote from said arm.

* * * * *